May 3, 1966  P. TUETEY  3,248,783

METHOD OF MANUFACTURE OF A PIN PALLET FORK OF A TIMEPIECE

Filed Nov. 6, 1962

INVENTOR
PAUL TUETEY
BY
ATTORNEYS

United States Patent Office 3,248,783
Patented May 3, 1966

3,248,783
METHOD OF MANUFACTURE OF A PIN PALLET FORK OF A TIMEPIECE
Paul Tuetey, Le Locle, Switzerland, assignor to Les Fabriques d'Assortiments Reunies, Le Locle, Switzerland
Filed Nov. 6, 1962, Ser. No. 235,675
Claims priority, application Switzerland, Nov. 9, 1961, 13,002/61
6 Claims. (Cl. 29—178)

The present invention relates to a method of manufacture of a pallet fork of a timepiece, more particularly a pin pallet fork commonly used in the timepieces of the "Roskopf" type.

Setting of the pins of a pin pallet fork is very delicate. This operation, which is generally done by driving in, requires much care and precision and is, therefore, very expensive.

The invention aims at overcoming these drawbacks and provides a method wherein at least one of the elements of the pin pallet fork—pins, fork staff and safety pin—is fixed in a machined recess which orients the same.

The accompanying drawing shows, by way of example, how the method according to the invention may be carried out.

Figure 1:
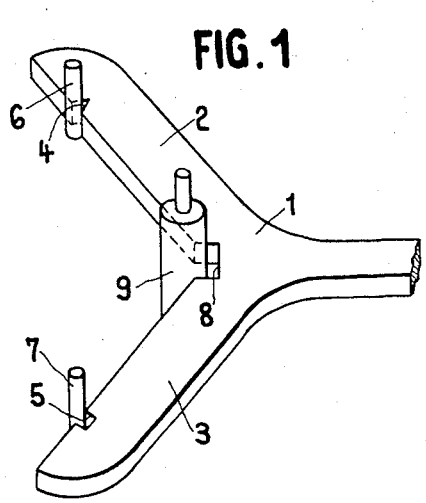
Figure 2:
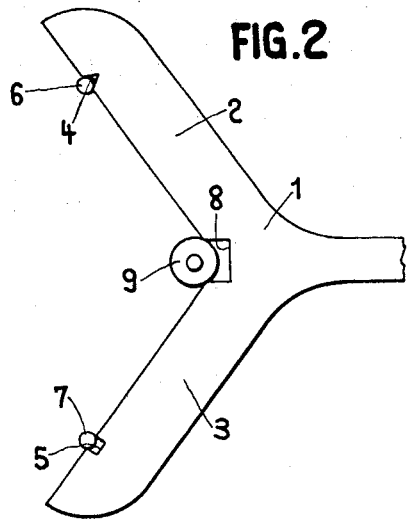
Figure 3:
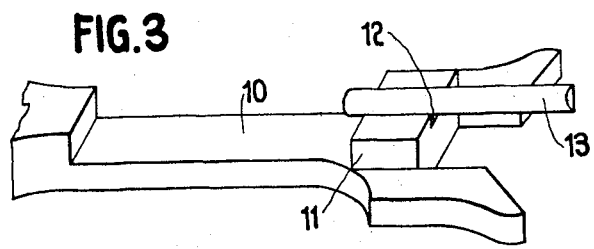
Figure 4:
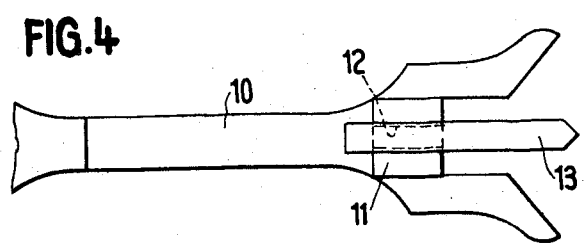
Figure 5:
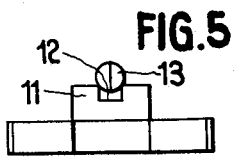

FIG. 1 is a perspective view of a pin pallet fork.
FIG. 2 is a plan view of the same.
FIG. 3 is a perspective view of the pallet fork portion carrying the safety pin.
FIG. 4 is a plan view of the same.
FIG. 5 is an end view of the same.

FIGS. 1 and 2 illustrate the body 1 of the pin pallet fork with the arms 2 and 3. In each of the arms 2 and 3 is provided a milled recess of a triangular shape 4 or of a rectangular shape 5, and then pins 6 and 7 made of polished steel are fixed by welding into these recesses.

In the same manner, a notch 8 is provided in the body 1 of the pallet fork and receives the fork staff 9 which is fixed by welding into this notch.

Milling of the recesses 4, 5 and 8 may be made on several pallet forks at a time, said pallet forks being beforehand piled up. The pins 6 and 7 may be taken directly from a roll of calibrated and polished wire and then cut therefrom.

The mode of positioning and securing described above may be applied for fixing the safety pin 13. FIGS. 3 to 5 illustrate the end portion 10 of the pallet fork, said portion 10 being rigidly connected with a block 11. In the latter is provided a milled notch 12 into which the safety pin 13 is positioned and secured, for instance by welding.

Securement of the pins 6, 7, of the fork staff 9 or of the safety pin 13 may also be made by resistance welding, sticking or by any other method.

It results from the foregoing and from the drawing, that the recesses or notches into which the parts are secured, simultaneously serve to orient these parts in the proper position.

Various changes in the construction, design and operation of the invention as shown and described, may be made, within the scope of the appended claims, without departing from the spirit of the invention or sacrificing any advantages thereof.

I claim:
1. A method of manufacture of a pin pallet fork of a timepiece of the type having a generally flat Y-shaped body having cylindrical pins protruding from its stem and arms, such as a fork staff pin and a safety pin, comprising the steps of machining at least one recess in a face of said body to provide parallel sharp edges, partially engaging a cylindrical pin in said recess in a position such that two generating lines of said pin bear against said sharp edges to exactly orient the pin with respect to the fork body, and then bonding said pin to the fork body to fixedly secure the pin in said position.
2. A method according to claim 1, wherein said bonding of the pin is made by welding.
3. A method according to claim 1, wherein said bonding of the pin is made by sticking.
4. A method according to claim 1, wherein said recess is machined by milling.
5. A method according to claim 4, wherein milling of said recess is made on several pallet forks at a time, said pallet forks being beforehand piled up.
6. A method according to claim 1, wherein said pin is cut from a roll of calibrated and polished wire prior to positioning in said recess.

References Cited by the Examiner
UNITED STATES PATENTS

| | | | |
|---|---|---|---|
| 856,091 | 6/1907 | Ohlson | 58—122 |
| 1,748,822 | 2/1930 | Arsem | 29—411 |
| 2,192,904 | 3/1940 | Ferris | 29—482 |
| 2,359,350 | 10/1944 | Bruno | 29—482 X |
| 2,451,595 | 10/1948 | Wheeler | 101—328 |
| 3,030,698 | 4/1962 | Pissarevsky | 29—411 |

JOHN F. CAMPBELL, Primary Examiner.
THOMAS H. EAGER, Assistant Examiner.